(12) United States Patent
Rosenquist

(10) Patent No.: US 7,194,168 B2
(45) Date of Patent: Mar. 20, 2007

(54) TIGHT BUFFER OPTICAL FIBER RIBBON

(75) Inventor: Jeff Rosenquist, Wendell, NC (US)

(73) Assignee: Nexans, Paris (FR)

( * ) Notice: Subject to any disclaimer, the term of this patent is extended or adjusted under 35 U.S.C. 154(b) by 0 days.

(21) Appl. No.: 11/071,528

(22) Filed: Mar. 3, 2005

(65) Prior Publication Data

US 2006/0198586 A1    Sep. 7, 2006

(51) Int. Cl.
*G02B 6/44* (2006.01)
(52) U.S. Cl. ..................... 385/114; 385/106
(58) Field of Classification Search ............... 385/114, 385/106; 11/11
See application file for complete search history.

(56) References Cited

U.S. PATENT DOCUMENTS

| | | | |
|---|---|---|---|
| 4,147,407 A | | 4/1979 | Eichenbaum et al. .... 350/96.34 |
| 4,715,677 A | | 12/1987 | Saito et al. ............ 350/96.23 |
| 5,673,352 A | * | 9/1997 | Bauer et al. ................ 385/114 |
| 5,737,470 A | * | 4/1998 | Nagano et al. ............. 385/114 |
| 6,185,351 B1 | * | 2/2001 | Daneshvar et al. ......... 385/114 |
| 6,678,449 B2 | * | 1/2004 | Thompson et al. ......... 385/114 |
| 2002/0168156 A1 | * | 11/2002 | Quiroz ....................... 385/114 |
| 2002/0197033 A1 | * | 12/2002 | Patel ........................... 385/114 |
| 2003/0016924 A1 | * | 1/2003 | Thompson et al. ......... 385/114 |
| 2003/0161596 A1 | * | 8/2003 | Register et al. ............ 385/106 |
| 2004/0114889 A1 | * | 6/2004 | Lee ............................. 385/114 |

FOREIGN PATENT DOCUMENTS

JP        54105561        8/1979

OTHER PUBLICATIONS

European Search Report- May 16, 2006.

* cited by examiner

*Primary Examiner*—Ellen E. Kim
(74) *Attorney, Agent, or Firm*—Sofer & Haroun, LLP

(57) ABSTRACT

A tight buffer optical fiber ribbon is formed from a plurality of optical fibers, each of which has a glass core, a primary coating and a second tight buffer layer. The ribbon includes first and second stand off legs, each having an inner strength core and an outer tight buffer layer. The plurality of optical fibers are coupled to one another in a substantially sequential ribbon arrangement via their tight buffer layer. The first stand off leg is attached to the substantially sequential ribbon arrangement of the optical fibers at a first end, and the second stand off leg is attached to the substantially sequential ribbon arrangement of the optical fibers at a an opposite second end.

17 Claims, 6 Drawing Sheets

TIGHT BUFFER OPTICAL FIBER RIBBON

FIELD OF THE INVENTION

This invention relates to optical fibers. More particularly, this invention relates to tight buffer optical fiber cables.

BACKGROUND OF THE INVENTION

Optical fibers are generally constructed with a glass core of approximately 125 micron thickness, and are used to transmit signals across the fiber in the form of light or light pulses. Currently, optical fibers are typically produced with a UV-curable coating, such as a UV acrylate material. This primary buffer is applied in the fiber drawing process in a drawing tower. The UV curable coating increases the overall size of the outside diameter of the fiber to approximately 250 microns. UV coated fibers are typically individually inked with different colors for identification. The fibers may then placed into a ribbon matrix or otherwise bundled together and placed into plastic tubing for use in outdoor applications.

For indoor applications it is required that the fibers meet certain fireproofing standards. However, the standard UV curable coating described above, is highly flammable. To meet the fireproofing standards, a second fire retardant PVC-jacket is extruded onto the base UV coated optical fiber, forming what is know as tight buffer fibers. These tight buffer fibers are typically in the thickness range of 900 microns and bundled and jacketed for use in mostly indoor applications and some outdoor applications as well.

However, there is no current solution for indoor use fiber cable arrangements that meet the necessary fire standards, can be handled regularly for splicing operations and are also capable of standing alone use without the need for a secondary bundling, such as insertion within a tube or other external binding.

OBJECTS AND SUMMARY OF THE INVENTION:

The present invention looks to overcome the drawbacks associated with the prior art by providing a stand alone fiber optical cable, containing plurality of fibers, that can be handled regularly for splicing or other such operations, that is fireproofed to the extent necessary to meet industry standards and is also economically designed in that it does not require a secondary outer sheathing or tubing for the fibers.

To this end, the present invention provides for a tight buffer optical fiber ribbon having a plurality of optical fiber, where each of the optical fibers has a glass core, a primary coating and a second tight buffer layer. First and second stand off legs each have an inner strength core and an outer tight buffer layer, where the plurality of optical fibers are coupled to one another in a substantially sequential ribbon arrangement via their tight buffer layer and where the first stand off leg is attached to the substantially sequential ribbon arrangement of the optical fibers at a first end, and where the second stand off leg is attached to the substantially sequential ribbon arrangement of the optical fibers at a second end, opposite the first end.

BRIEF DESCRIPTION OF THE DRAWINGS

The subject matter regarded as the invention is particularly pointed out and distinctly claimed in the concluding portion of the specification. The invention, however, both as to organization and method of operation, together with features, objects, and advantages thereof may best be understood by reference to the following detailed description when read with the accompanying drawings in which:

DETAILED DESCRIPTION

Figure 1:
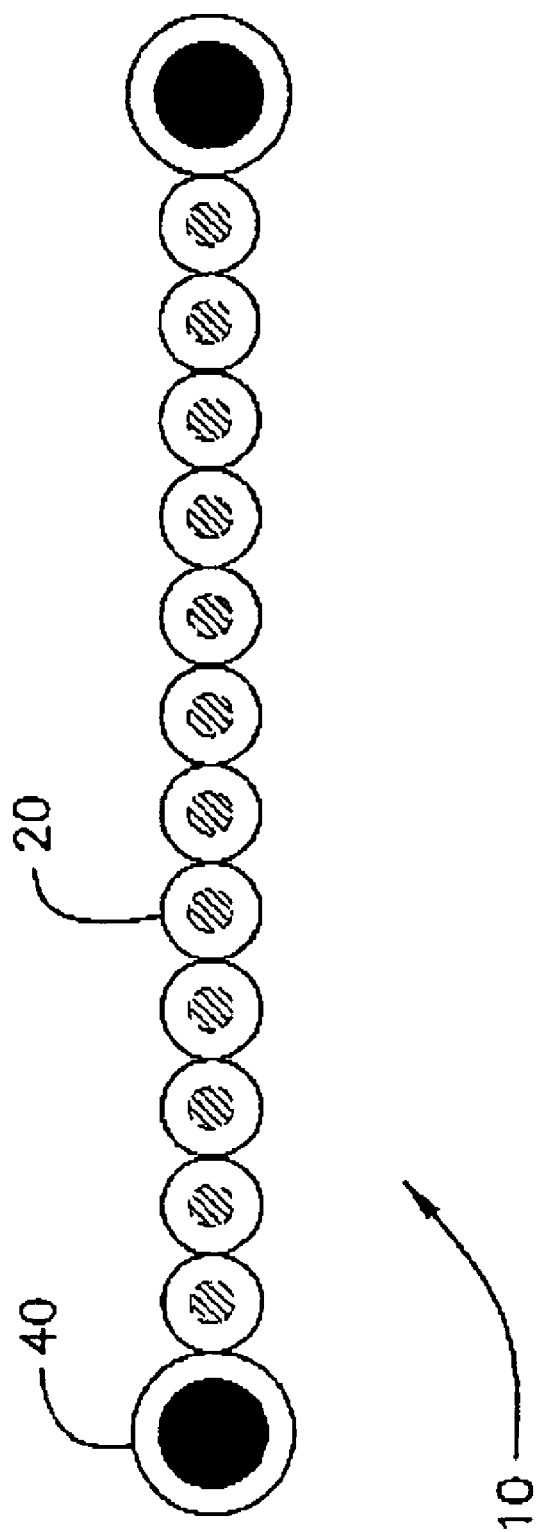
FIG. 1 is a cross section diagram of tight buffer optical fiber ribbon, in accordance with one embodiment of the present invention.

As illustrated in FIG. 1, the present invention provides for a tight buffer optical fiber ribbon 10. Generally, ribbon 10 is composed of a number of tight buffer optical fibers 20 and stand off legs 40 formed into a ribbon matrix.

Figure 2:
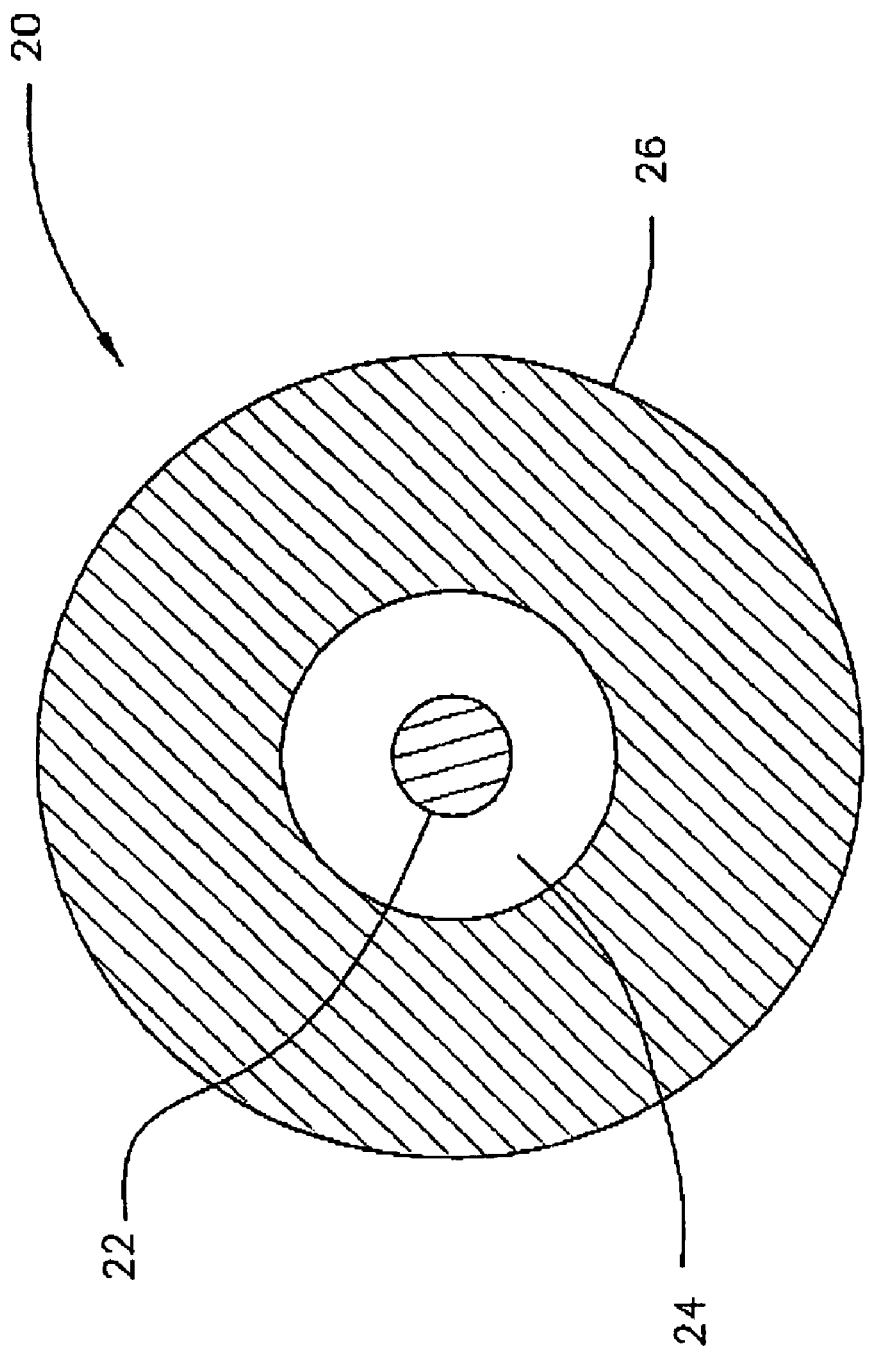
FIG. 2 is a close up view of an individual tight buffer optical fiber from FIG. 1, in accordance with one embodiment of the present invention.

In one embodiment of the present invention, as illustrated in FIG. 2, a single tight buffer optical fiber 20 comprises three basic components, a glass core 22, a UV cured layer 24 and a tight buffer layer 26.

Glass core 22 is any glass optical core generally used for forming optical fibers and is preferably 125 microns in diameter. UV cured layer 24 is any typical primary UV coating, such a UV acrylate primary coating. UV cured layer 24 is generally translucent, applied during the fiber drawing process in a drawing tower, and preferably brings the total diameter of optical fiber 20 to 250 microns is diameter.

Tight buffer layer 26 is extruded onto optical fiber 20 and generally consists of PVC (Polyvinyl Chloride) buffer, however any similar polymers such as amorphous polyethylene may be used as well. Tight buffer layer 26 preferably brings the total diameter of optical fiber 20 to 900 microns in total thickness. It is possible to add color pigmentation during the extruding process such that tight buffer layer 26 exhibits a unique color for each of the plurality of optical fibers 20 in ribbon 10.

As such, a tight buffer fiber optic cable 20 is produced with a significant PVC coating that allows the cable 20 to meet the necessary standard fire safety ratings such as UL 910 (plenum), and UL 1666 (riser).

It is understood that the above materials and sizes used for tight buffered optical fiber 20 are by way of example. However, any similar tight buffer optical fiber used in a similar ribbon 10, is within the scope of the present invention.

Figure 3:
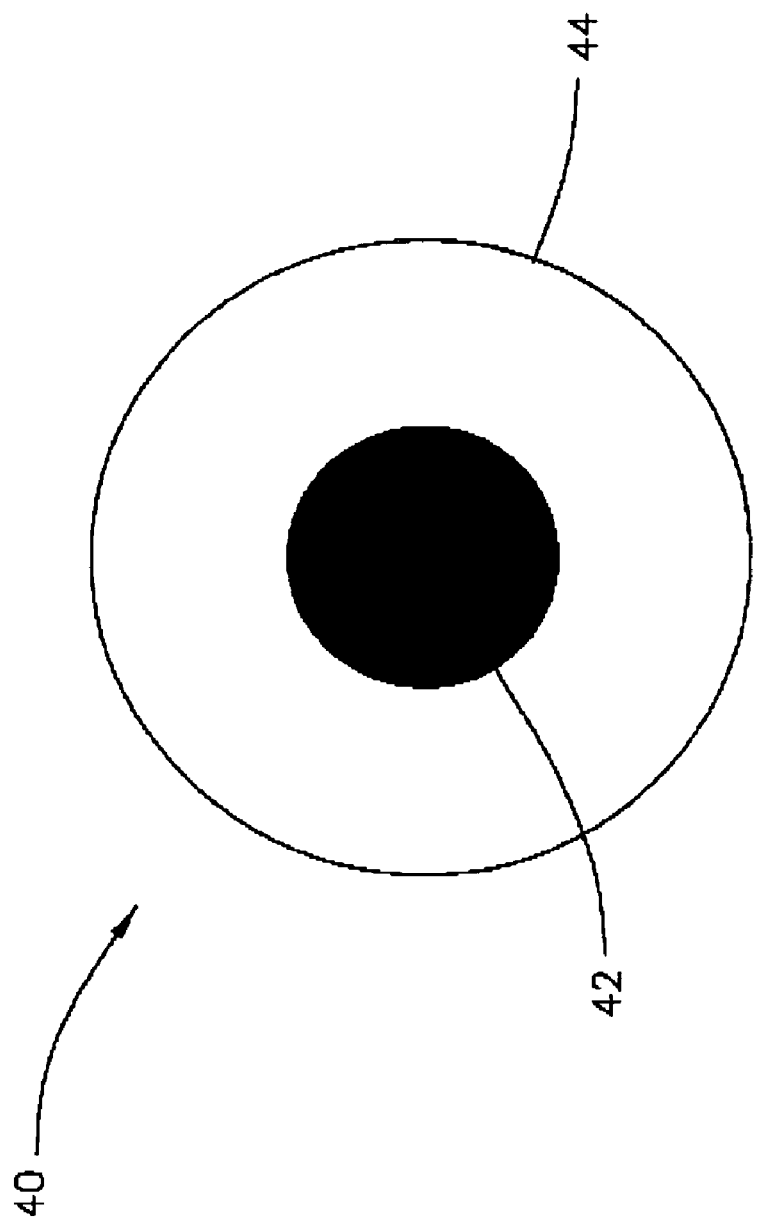
FIG. 3 is a close up view of a stand off leg from FIG. 1, in accordance with one embodiment of the present invention.

In one embodiment of the present invention, as illustrated in FIG. 3, stand off leg 40 is shown having two basic components, strength core 42 and tight buffer layer 44. Strength core 42 is preferably 900 microns in diameter and can be formed of any number of materials suitable for providing the proper balance of strength and flexibility to ribbon 10. Such materials for strength core 42 can be any number of commercially available materials, including but not limited to, GRP (Glass Reinforced Plastic), FRP (Fiber Reinforced Plastic), Kevlar™ aramid fibers and Kevlar™ rip cords.

Tight buffer layer 44 is similar in composition to tight buffer layer 26 of optical fiber 20, and is preferably an extruded layer of PVC buffer, that brings the total diameter of stand off leg 40 to about 1500–1800 microns. As with tight buffer layer 26, tight buffer layer 44 is of sufficient thickness so that complete stand off leg 40 meets the same necessary fire safety standards as optical fiber 20.

Again, as with optical fiber 20, the above described materials and sizes used for stand off leg 40 are by way of example. However, any similar stand off leg used in a similar ribbon 10, is within the scope of the present invention.

Once optical fibers 20 and stand off legs 40 are formed, tight buffer optical fiber ribbon 10, as illustrated in FIG. 1, is constructed using assembly methods for producing ribbon cables.

Using a ribbon cable loom, the various desired strands of optical fibers 20 (12 in this example) are drawn from their individual spools and assembled into a side by side and substantially sequential arrangement, with one stand off leg 40 on either side of the arrangement. In order to complete and secure individual optical fibers 20 and stand off legs 40 into ribbon 10, they are treated with a solvent as they are brought into contact with one another. Typical examples for solvents may include but are not limited to MEK (Methyl Ethyl Ketone) or Cyclohexanone.

As the strands of optical fibers 20 and stand off legs 40 are pulled through the loom from the originating spools into the arrangement shown in FIG. 1, the treatment by the solvent causes the outer portions of tight buffer layer 26 of optical fibers 20 and tight buffer layer 44 of stands of legs 40 momentarily dissolve. In this partially dissolved state, as the loom pulls fibers 20 and stand off legs 40 in contact slightly pressured contact with one another, the various tight buffer layers 26 and tight buffer layers 44 chemically weld themselves to one another. As the amount of solvent is minimal, when the optical fibers 20 and stand off legs 40 are removed from the solvent (or the solvent evaporates), the resulting structure provides a tight buffer optical fiber ribbon 10, having twelve connected optical fibers 20, with stand off legs 40 on either side, as illustrated in FIG. 1.

It is understood that although tight buffer optical fiber ribbon 10 is described above as being formed using chemical welding, the invention is not limited in that respect. Any manner for forming a similar tight buffer optical fiber ribbon 10 that results in a substantially similar structure, is within the contemplation of the present invention.

In this arrangement tight buffer optical fiber ribbon 10, acts as a self contained fiber optic cable without the need for an additional tubing or jacketing. The tight buffer layer 26 of optical fibers 20 is sufficient for protecting glass core 22 and is also sufficient to meet the necessary indoor fire safety ratings.

Furthermore, stand off legs 40 of ribbon 10 add additional strength allowing ribbon 10 to be stapled to structures or used in otherwise high stress environments, by providing a crush resistant barrier on either side of optical fibers 20. Stand off legs 40 also provide additional structural support to ribbon 10, allowing it to bend around corners, or doors or even to be used in high stress installation methods such as being blown into ducts with compressed air.

Additionally, in this arrangement of ribbon 10 each of the optical fibers 20 can be easily separated for connectorizing, yet the ribbon keeps optical fibers 20 together neatly in the cabinet space.

Figure 4:
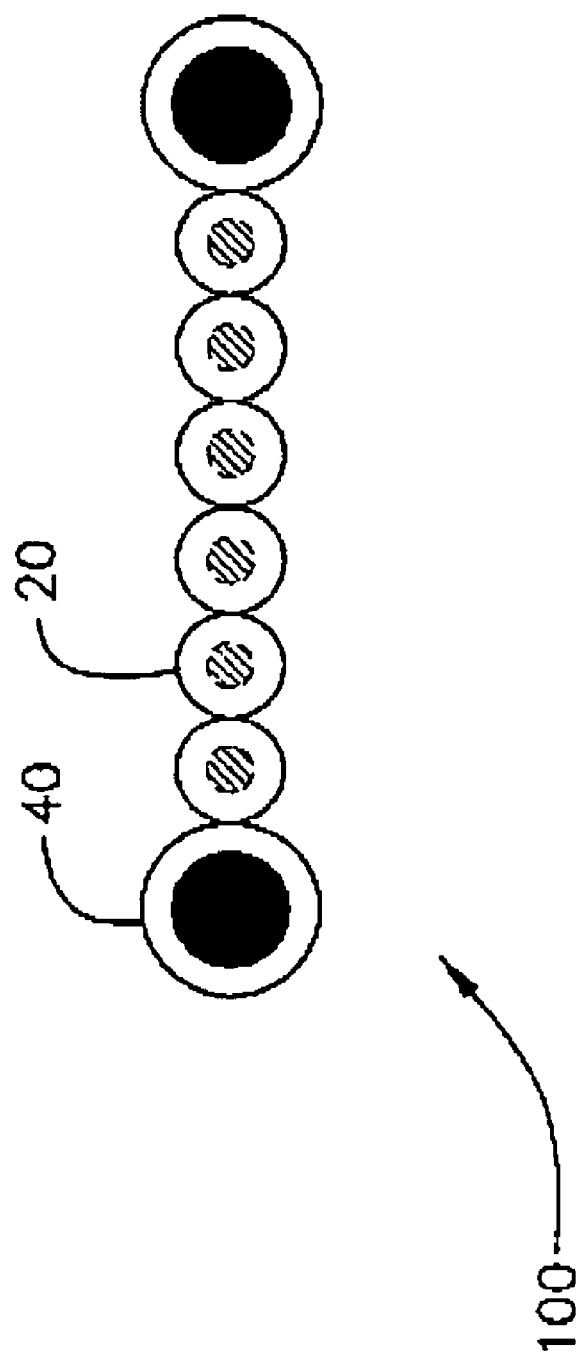
FIG. 4 is a cross section diagram of tight buffer optical fiber ribbon, in accordance with another embodiment of the present invention.

In one embodiment of the present invention, as illustrated in FIG. 4, an alternative tight buffer optical ribbon 100 arrangement is shown, using only six optical fibers 20 with one stand off leg 40 on either side. This provides a lighter version of ribbon 10 as shown in FIG. 1. It is understood that any such arrangement of tight buffer optical fibers with stand off legs 40 disposed on either side of ribbon 10 or 100, is within the contemplation of the present invention.

Furthermore, in one embodiment of the present invention, it is also contemplated that multiple ribbons 10/100 could be combined into a larger fiber matrix 200 by combining multiple tight buffer optical fiber ribbons 10 or tight buffer optical fiber ribbons 100 together with one another within an outer matrix jacket 202. These matrix arrangements discussed below have additional advantages over cables that simply place loose, non-ribboned tight buffer fibers within an outer jacket For example, cables using fiber matrix 200 can be used for bulk fuse splicing and also keep the splice cabinet in better order by holding the fibers in a close arrangement with one another within the cabinet. Also, because strength members 40 are already incorporated into ribbons 10 used in fiber matrix 200, there is less or even no need to add additional strength members to the fiber optic cable, thereby allowing for smaller overall jacket cross section area needed to contain the same amount of fibers.

Figure 5:
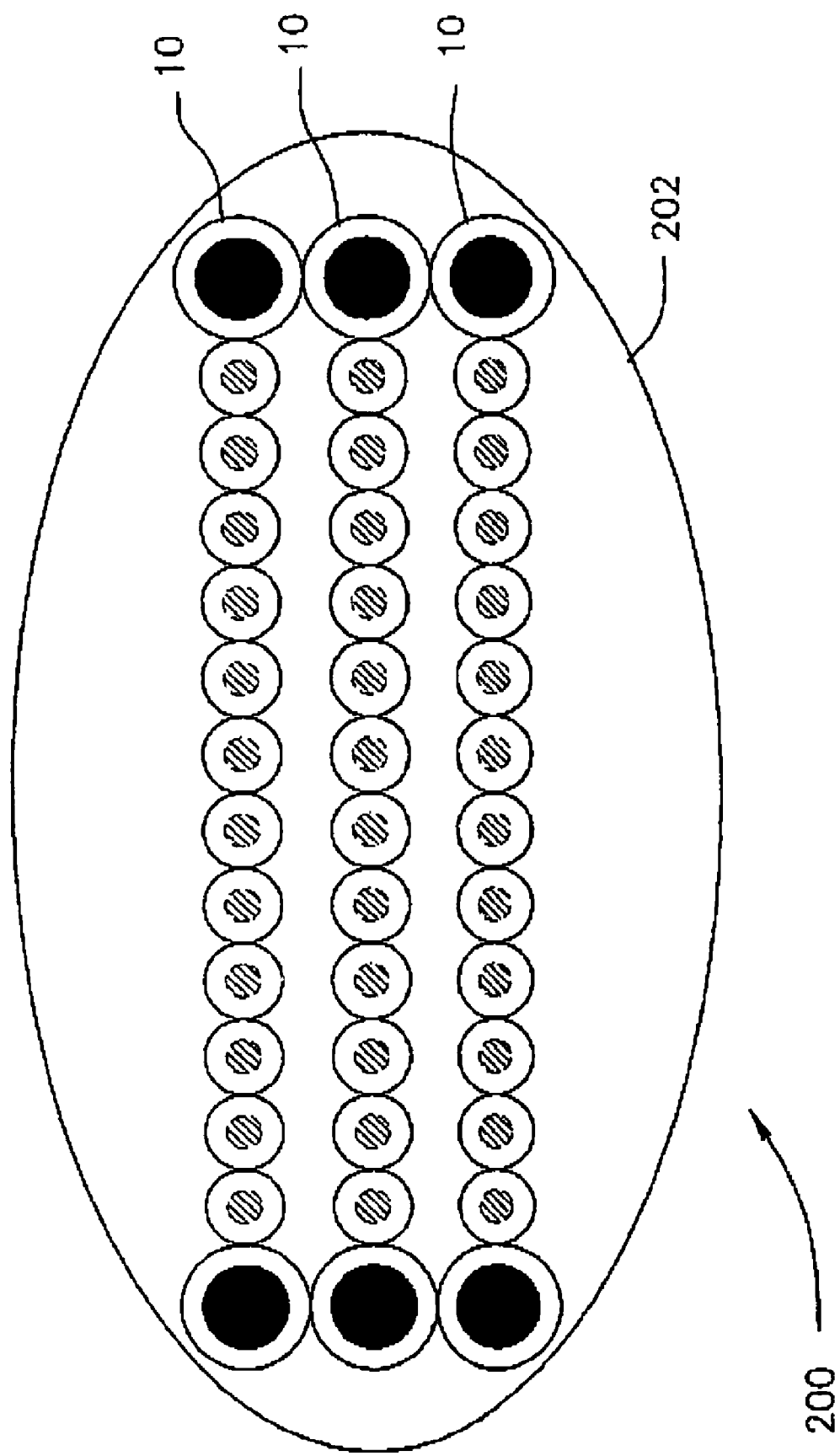
FIG. 5 is a cross section diagram of a fiber matrix formed from the tight buffer optical fiber ribbon of FIG. 1, in accordance with another embodiment of the present invention.

A first example of larger fiber matrix 200 is shown in FIG. 5, where a 36 fiber matrix is formed by placing three 12 fiber tight buffer optical fiber ribbons 10 on top of one another and placed within extruded jacket 202. As shown in FIG. 5, fiber matrix 200 has three fiber ribbons 10 within outer jacket 202. As described in detail above, each ribbon 10, already includes strength members 40, and thus fiber matrix 200 does not require additional strengthening bands or fibers within jacket 202. Thus, in this stacked arrangement assuming jacket 202 having an outer thickness of 0.040" the cross section of fiber matrix 200 can be reduced to 0.109 in$^2$ as opposed to a conventional cable having 36 separate tight buffer fibers in a loose arrangement within the outer jacket which would exhibit a cross section of 0.220 in$^2$.

In addition to simply placing multi-fiber ribbons 10 into fiber matrix 200 in a simple stacking arrangement, additional stranding of the ribbons 10 and 100 within a jacket may be used to reduce microbending stresses on the glass within tight buffer fibers 20 within ribbons 10 and 100. Further arrangements, as illustrated in FIG. 6 may include the addition of an up-jacketed yarn 304 placed in the middle of a fiber ribbon matrix 300 in order to allow a folding or curling point for the stranding of ribbons 100 of matrix 300 within jacket 202.

Figure 6:
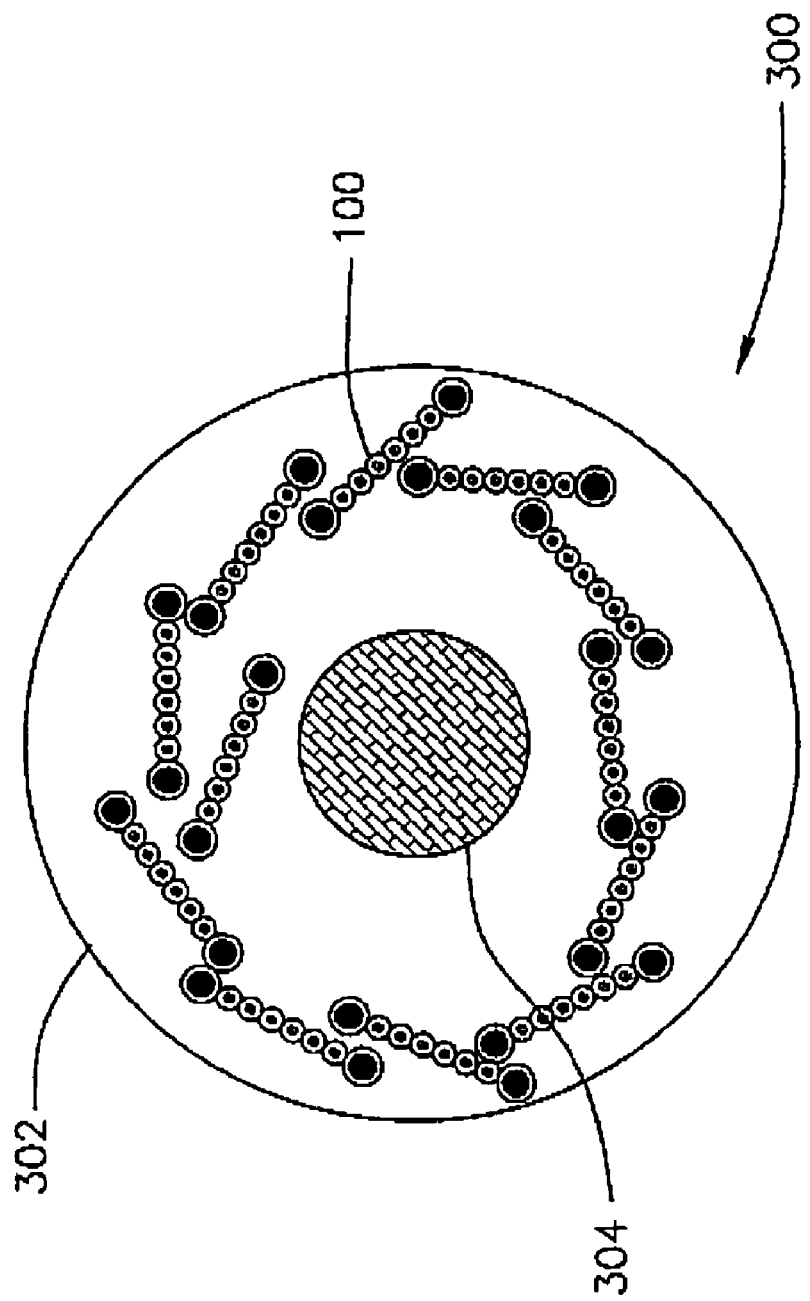
FIG. 6 is a cross section diagram of a fiber matrix formed from the tight buffer optical fiber ribbon of FIG. 4, in accordance with another embodiment of the present invention.

For example, a larger fiber matrix 300 is shown in FIG. 6, where a 72 fiber matrix is formed by winding twelve 6 fiber tight buffer optical fiber ribbons 100 around a central core such as a Kevlar™ aramid yarn 304 all of which are held within outer jacket 302. Similar to matrix 200 illustrated in FIG. 5, even though yarn 304 may be used for the stranding of ribbons 100, still the overall cross section area of a cable having matrix 300 within jacket 302 is significantly less than would be found in the typical cable with 72 loose tight buffer fibers within the jacket because no additional strength members need to be added beyond strength members 40 already incorporated into ribbons 100.

In both of these arrangements significantly less strength material needs to be used because fiber ribbon 10 and fiber ribbon 100 already contain strength giving stand off legs 40 within their own structure.

It is understood that such examples of multi-ribbon fiber matrixes 200 and 300 are by way of example. Any multi-ribbon matrix that utilizes similar tight buffer optical fiber ribbons 10/100 are within the contemplation of the present invention.

While only certain features of the invention have been illustrated and described herein, many modifications, substitutions, changes or equivalents will now occur to those skilled in the art. It is therefore, to be understood that this application is intended to cover all such modifications and changes that fall within the true spirit of the invention.

What is claimed is:

1. A tight buffer optical fiber ribbon comprising:
   a plurality of optical fibers, each of said optical fibers having a glass core, a primary coating and a second tight buffer layer, said second tight buffer layer being a polymer layer; and
   first and second stand off legs, said stand off legs having an inner strength core and an outer tight buffer layer, also formed as a polymer layer, wherein said plurality of optical fibers are coupled to one another in a substantially sequential ribbon arrangement via their tight buffer layers only and wherein said first stand off leg is attached to said substantially sequential ribbon arrangement of said optical fibers at a first end via said outer tight buffer layer only, and wherein said second stand off leg is attached to said substantially sequential ribbon arrangement of said optical fibers at a second end, opposite said first end, also via said outer tight buffer layer only.

2. The tight optical fiber ribbon as claimed in claim 1, wherein said plurality of optical fibers are individually colored.

3. The tight optical fiber ribbon as claimed in claim 1, wherein said tight buffer layer of said optical fibers and said stand off legs are formed from PVC.

4. The tight buffer optical fiber ribbon as claimed in claim 1, wherein said inner strength core of said stand off legs is formed from any one of: GRP (Glass Reinforced Plastic), FRP (Fiber Reinforced Plastic), Kevlar™ aramid fibers and Kevlar™ rip cord.

5. The tight buffer optical fiber ribbon as claimed in claim 1, wherein said substantially sequential ribbon arrangement of said optical fibers and said first and second stand off legs are attached to one another using chemical welding.

6. The tight buffer optical fiber ribbon as claimed in claim 5, wherein said chemical welding is performed using methyl ethyl ketone (MEK) or cyclohexanone.

7. The tight buffer optical fiber ribbon as claimed in claim 1, wherein said optical fibers are substantially 900 microns in diameter around said second tight buffer layer and wherein said stand off legs are substantially 1500–1800 microns in diameter around said outer tight buffer layer.

8. A tight buffer optical fiber cable comprising:
   a plurality of fiber ribbons, each fiber ribbon having a plurality of optical fibers arranged in a substantially sequential ribbon arrangement, each of said optical fibers having a glass core, a primary coating and a second tight buffer layer, said second tight buffer layer being a polymer layer, said fiber ribbon also having first and second stand off legs, said stand off legs having an inner strength core and an outer tight buffer layer, also formed as a polymer layer, said first stand off leg is attached to said substantially sequential ribbon arrangement of said optical fibers at a first end via said outer tight buffer layer only, and wherein said second stand off leg is attached to said substantially sequential ribbon arrangement of said optical fibers at a second end, opposite said first end, also via said outer tight buffer layer only; and
   an outer jacket extruded over said plurality of fiber ribbons.

9. The tight buffer optical fiber cable as claimed in claim 8, wherein said plurality of optical fiber ribbons are ranged in stacked matrix within said outer jacket.

10. The tight buffer fiber cable as claimed in claim 9, wherein said stacked matrix is formed from three stacked optical fiber ribbons, each of said ribbons having twelve optical fibers therein.

11. The tight buffer optical fiber cable as claimed in claim 8, wherein said plurality of optical fiber ribbons are arranged in stranded matrix within said outer jacket.

12. The tight buffer optical fiber cable as claimed in claim 11, wherein said stranded matrix of optical fiber ribbons further comprises a central yarn.

13. The tight buffer fiber cable as claimed in claim 12, wherein said stranded matrix is formed from twelve stranded optical fiber ribbons, each of said ribbons having six optical fibers therein.

14. A method for manufacturing tight buffer optical fiber ribbon, said method comprising the steps of:
   providing a plurality of optical fibers, each of said optical fibers having a glass core, a primary coating and a second tight buffer layer, said second tight buffer layer being a polymer layer;
   providing first and second stand off legs, said stand off legs having an inner strength core and an outer tight buffer layer, also formed as a polymer layer;
   pulling said plurality of optical fibers and said first and second stand off legs through a device, whereby said optical fibers and said stand off legs are brought into mating relationship with one another; and
   subjecting said plurality of optical fiber and said stand off legs to a connecting process whereby said outer tight buffer layers of said first and second stand off legs and said second tight buffer layer of said optical fibers are connected into said ribbon in a substantially planar arrangement via said outer tight buffers layers only, and wherein said first stand off leg is attached to said ribbon at a first end via said outer tight buffer layer only, and wherein said second stand off leg is attached to said ribbon at a second end, also via said tight buffer only, opposite said first end, with said optical fibers disposed therebetween.

15. The method as claimed in claim 14, wherein said device used in said pulling step is ribbon loom.

16. The method as claimed in claim 14, wherein said connecting process is chemical welding.

17. The method as claimed in claim 16, wherein said chemical welding is conducted using any one of methyl ethyl ketone (MEK) and cyclohexanone.

* * * * *